No. 711,180. Patented Oct. 14, 1902.

G. C. STONE.

APPARATUS FOR MAKING SULFURIC ACID BY THE CONTACT PROCESS.

(Application filed Aug. 14, 1900.)

(No Model.)

UNITED STATES PATENT OFFICE.

GEORGE C. STONE, OF JERSEY CITY, NEW JERSEY, ASSIGNOR TO THE NEW JERSEY ZINC COMPANY, A CORPORATION OF NEW JERSEY.

APPARATUS FOR MAKING SULFURIC ACID BY THE CONTACT PROCESS.

SPECIFICATION forming part of Letters Patent No. 711,186, dated October 14, 1902.

Application filed August 14, 1900. Serial No. 26,878. (No model.)

*To all whom it may concern:*

Be it known that I, GEORGE C. STONE, a citizen of the United States, residing in Jersey City, county of Hudson, State of New Jersey, have invented certain new and useful Improvements in Apparatus for Making Sulfuric Acid by the Contact Process; and I do hereby declare the following to be a full, clear, and exact description of the invention, such as will enable others skilled in the art to which it appertains to make and use the same.

My invention relates to certain new and useful improvements in apparatus for making sulfuric acid by the contact process, and has for its object to insure a high degree of continuous efficiency in the working or operation of the plant as well as to utilize fully and exhaustively the charge of contact material.

Figure 1:
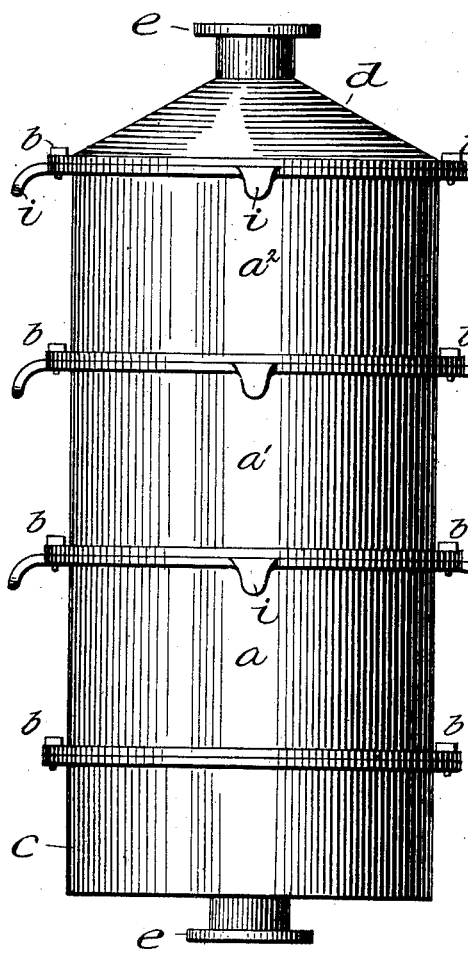
Figure 2:
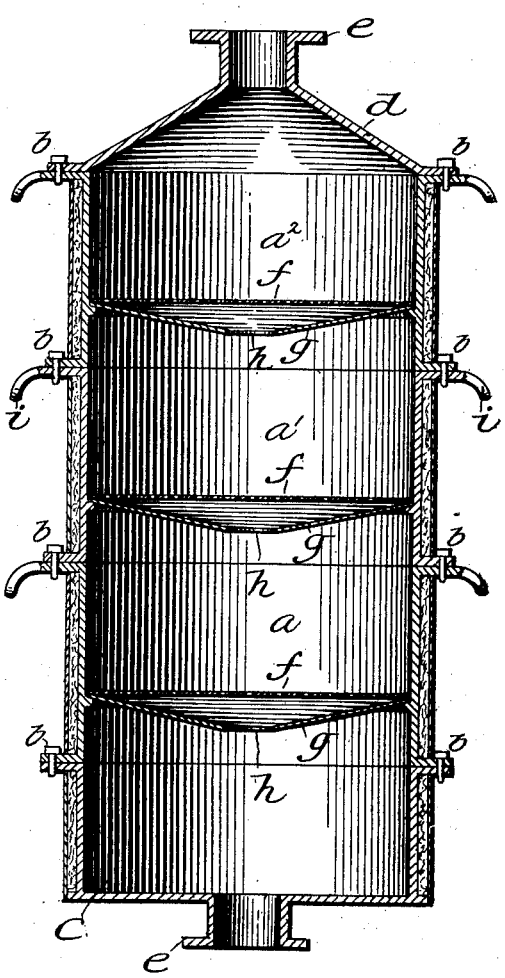

In the accompanying drawings, Figure 1 represents in elevation a form of apparatus embodying my invention. Fig. 2 represents a vertical section thereof.

Similar letters of reference indicate similar parts throughout both views.

Referring to the drawings, it will be noted that those portions of the apparatus which support the contact material consist of a series of individual superposed sections $a$ $a'$ $a^2$, which may conveniently be of cylindrical contour and which are preferably jacketed with non-conducting material, as indicated, to prevent or minimize the radiation of heat. These sections are flanged at top and bottom and are provided with dowel-pins $b$, fitting in corresponding recesses, thus insuring accurate register or alinement of the sections, while permitting the ready removal of any particular one and its substitution by another, for the purposes hereinafter set forth.

The series of cylindrical sections rest upon a fixed section $c$ and are surmounted by a roof-section $d$. These last-named sections are provided with flanged cylindrical extensions $e$ for connection, respectively, with the inlet and exit pipes for the contact-gases.

Each of the sections $a$ is provided with a screen or reticulated bottom $f$ to support the contact mass, which may be of any kind adapted for effecting by catalytic or contact action the union of $SO_2$ and O into $SO_3$. It is also desirable, but not essential, that a diaphragm $g$, having a central orifice $h$, be inserted beneath each screen in order to effect a more intimate mixture of the gases on their way through the apparatus. Each of the sections $a$ may likewise be provided with suitable lugs $i$, projecting from the top flange, for the purpose of conveniently lifting and manipulating the sections.

The operation of the invention is as follows: The gases to be acted upon (containing $SO_2$ and O) after preliminary heating to a suitable temperature, are admitted into the apparatus, preferably so as to pass from below upward, although, if preferred, the gases may be passed from above downward. During the passage of the gases through the contact material the $SO_2$ and O unite upon coming in contact with the finely-divided platinum or other catalytic active agent in the mass and form sulfuric anhydrid in the well-known manner. After the apparatus has been in operation for some time it becomes necessary to renew or regenerate the contact mass and for this purpose to remove it from the apparatus. By means of my invention this may be done progressively in such manner as to take out that portion of the charge which is nearest the inlet for the gases and which is the first to be traversed thereby. For instance, assuming that the gases enter at the bottom of the apparatus and pass upwardly I first lift the entire apparatus, with the exception of the section $a$ and the stationary section below it, and I thereupon remove the section $a$. I then lower the remaining sections $a'$ $a^2$ until they rest upon the stationary bottom section, and I insert between the section $a^2$ and the roof-section a new section in all respects similar in construction to the sections $a$ $a'$ $a^2$ and containing an entirely fresh charge of the contact material. By this expedient I remove the section immediately proximate to the inlet for the contact-gases, and wherein by reason of the greater richness of the entering gas the contact material has become practically spent, whereas the efficiency of the contact material in the remaining sections still remains unexhausted and is, moreover, greater in the section $a^2$ than in the section $a'$ by reason of the increasing poverty of the gases to be united as they pass from one section to another. By inserting the new section, therefore, above the section $a^2$ the gases immediately before their exit from the apparatus pass through the richest portion of the charge. Consequently by thus supplying in regular rotation a new portion of the charge at the delivery end of the apparatus and at the same time that the spent portion of the charge is removed at the inlet of the apparatus the richest gas passes first through the poorest portion of the charge, then through a portion of the charge relatively richer, and finally through the richest portion of the charge, thus insuring the best conditions for good efficiency and permitting under economical conditions and with facility of operation the exhaustive utilization of the contact material, so that fully-spent material is removed from the apparatus at the same time that new or fresh material is inserted therein. So far as I am aware this is a new result in the art. In fact, prior to my invention it has only been commercially feasible to partially exhaust the contact material, inasmuch as the conditions of use required it to be withdrawn in its entirety from the apparatus when it had dropped as a whole below economic efficiency, but before it had really lost its combining power.

Having thus described my invention, what I claim is—

1. Apparatus for use in the contact process, comprising a series of compartments or sections, independently separable and removable, said sections containing each an individual charge of contact material in combination with gas inlet and outlet ducts; substantially as described.

2. Apparatus for use in the contact process, comprising a series of compartments or sections independently separable and removable, said sections being superposed and each containing an individual charge of contact material, in combination with gas inlet and outlet ducts; substantially as described.

3. Apparatus for use in the contact process, comprising a series of compartments or sections independently separable and removable, said sections being superposed, and provided with alining devices and lifting-lugs, and containing each an individual charge of contact material, in combination with gas inlet and outlet ducts; substantially as described.

4. Apparatus for use in the contact process, comprising a stationary bottom section, a roof-section, said sections being provided with gas-ducts, and a series of intervening compartments or sections, independently separable and removable, said intervening sections containing each an individual charge of contact material; substantially as described.

5. Apparatus for use in the contact process, comprising a stationary bottom section, a roof-section, said sections being provided with gas-ducts, and a series of intervening compartments or sections independently separable and removable, said intervening sections containing each an individual charge of contact material supported upon a screen, and a mixing-diaphragm located below each of said screens; substantially as described.

In testimony whereof I affix my signature in presence of two witnesses.

GEORGE C. STONE.

Witnesses:
E. T. NEWKIRK,
C. W. SEXTON.